United States Patent [19]

Seitz

[11] Patent Number: 4,841,049
[45] Date of Patent: Jun. 20, 1989

[54] REACTIVE DYES OF THE DIOXAZINE SERIES

[75] Inventor: Karl Seitz, Oberwil, Switzerland

[73] Assignee: Ciba-Geigy Corporation, Ardsley, N.Y.

[21] Appl. No.: 92,798

[22] Filed: Sep. 3, 1987

[30] Foreign Application Priority Data

Sep. 12, 1986 [CH] Switzerland ............... 3666/86

[51] Int. Cl.$^4$ ............... C07D 265/38; C09B 19/02
[52] U.S. Cl. ............................. 544/76; 544/77
[58] Field of Search ........................... 544/76, 77

[56] References Cited

U.S. PATENT DOCUMENTS

| | | | |
|---|---|---|---|
| 3,223,470 | 12/1965 | Boedeker et al. | 8/39 |
| 3,996,221 | 12/1976 | Leng et al. | 544/76 |
| 4,472,575 | 9/1984 | Renfrew | 544/76 |
| 4,568,742 | 2/1986 | Harms et al. | 544/76 |
| 4,578,461 | 3/1986 | Jäger | 544/76 |
| 4,588,810 | 5/1986 | Harms et al. | 544/76 |
| 4,591,643 | 5/1986 | Jäger | 544/76 |
| 4,604,459 | 8/1986 | Jäger | 544/76 |
| 4,621,138 | 11/1986 | Jäger et al. | 544/76 |
| 4,665,179 | 5/1987 | Wunderlich et al. | 544/76 |

FOREIGN PATENT DOCUMENTS

| | | |
|---|---|---|
| 0101665 | 2/1984 | European Pat. Off. . |
| 168751 | 1/1986 | European Pat. Off. . |
| 60-18359 | 5/1985 | Japan . |
| 62-48768 | 3/1987 | Japan . |
| 1477071 | 6/1977 | United Kingdom . |

*Primary Examiner*—Richard L. Raymond
*Attorney, Agent, or Firm*—Edward McC. Roberts; Kevin T. Mansfield; Meredith C. Findlay

[57] ABSTRACT

Reactive dyes of the formula

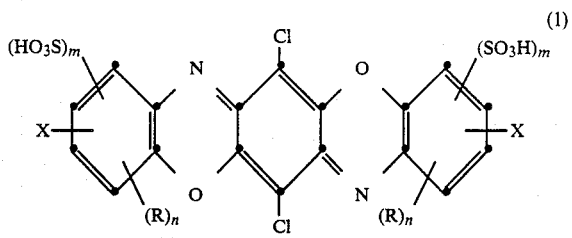

in which $(R)_n$ stands for n substituents R which, independently of each other, can be $C_{1-4}$-alkyl, $C_{1-4}$-alkoxy, halogen, carboxyl, carbamoyl, N-$C_{1-4}$-alkylcarbamoyl, N,N-di-$C_{1-4}$-alkylcarbamoyl, $C_{1-4}$-alkylsulfonyl, sulfamoyl, N-$C_{1-4}$-alkylsulfamoyl or N,N-di-$C_{1-4}$-alkylsulfamoyl, n is 0 to 2, m is 1 to 2, one X is an $H_2N$ group and the other X is a radical of the formula

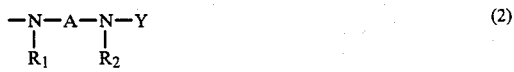

in which $R_1$ and $R_2$ are independently of each other hydrogen or substituted or unsubstituted $C_{1-4}$-alkyl, A is $C_{2-4}$-alkylene which can be substituted by halogen, hydroxyl, carboxyl, sulfo, phenyl, sulfophenyl or $C_{1-4}$-alkoxycarbonyl, or is cyclohexylene which can be substituted by $C_{1-4}$-alkyl, or in which the group —N(R$_1$)—A—N(R$_2$)— is 1,4-piperazinediyl, and Y is a reactive radical, are suitable for dyeing and printing cellulose-containing fibre materials and produce wet- and light-fast dyeings in bright blue shades.

15 Claims, No Drawings

REACTIVE DYES OF THE DIOXAZINE SERIES

The present application relates to novel improved reactive dioxazine which are suitable in particular for dyeing cillulose-containing fibre materials by the exhaust method and which produce wet- and light-fast dyeings in bright sky blue shades, and to processes for preparing these dyes and the their use for dyeing and printing textile materials.

The invention provides reactive dyes of the formula

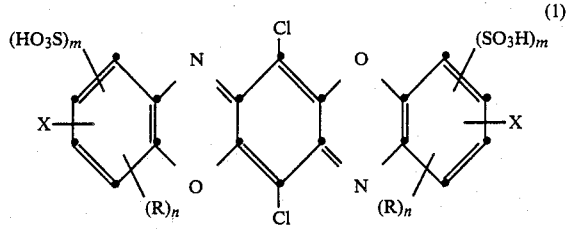

(1)

in which $(R)_n$ stands for n substituents R which, independently of each other, can be $C_{1-4}$-alkoxy, halogen, carboxyl, carbanoyl, N-$C_{1-4}$-alkylcarbamoyl, N,N-di-$C_{1-4}$-alkyl-carbamoyl, $C_{1-4}$- alkylsulfonyl, sulfamoyl, N-$C_{1-4}$-alkylsulfamoyl or N,N-di-$C_{1-4}$-alkylsufamoyl, n is 0 to 2, one x is an $H_2N$ group and the other X is a radical of the formula

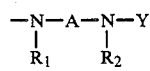

(2)

in which $R_1$ and $R_2$ are independently of each other hydrogen or substituted or unsubstituted $C_{1-4}$alkyl, A is $C_{2-4}$-alkylene which can be substituted by halogen, hydroxly, carboxyl, sulfo, phenyl, sulfophenyl or $C_{1-4}$-alkoxycarbonyl, or is cyclohexylene which can be substituted by $C_{1-4}$-alkyl, or in which the group —N($R_1$)—A—N($R_2$) is 1,4-piperazinediyl, and Y is a reactive radical.

Possible substitutents R are, for example methyl, ethyl, propyl, isopropyl, butyl, isobutyl, sec.-butyl, tert.-butyl, methoxy, ethoxy, propyloxy, isopropyloxy, butloxy, isobutyloxy, sec.-butyloxy, tert,-butyloxy, flourine, chlorine, bromine, carboxyl, carbamoyl, N-methlcarbamoyl, N-ethylcar-bamoyl, N,N-dimethylcarbamoyl, N,N-diethylcarbamoyl, methylsulfonl, ethylsulfonyl, sulfamoyl, N-methylsulfamoyl, N-ethylsulfamoyl, N,N-dimethylsulfamoly and N,N-diethylsufamoyl.

The $C_{1-4}$-alkyl for $R_1$ and $R_2$ in the formula (2) can be a straight-chain or branched alkyl radical which can also be substituted, for example by halogen, hydroxyl, cyano, sulfo or sulfato. Examples are: methyl, ethyl, propyl, isopropyl, butyl, isbutyl, sec.-butyl, tert.butyl, β-chloroethyl, β-hydroxyethyl, β-hydroxybutyl, β-cyanoethyl, sulfomethyl, β-sulfoethyl and β-sulfatoethyl.

The bridge member A can be straight-chain or branched and, as started above, be further substituted. Examples of A are: 1,2- and 1,3-propylene, 2-hydroxy-1,3-propylene, 1- and 2-phenyl-1,3-propylene, 2-(4'sulfophenyl)-1,3-propylene, 1,4-1,3-and 2,4-butylene, 2-methyl-1,3-proylene, 1-chloro-2,3-propylene, 2,3-diphenyl-1,4-butylene, 1,3-cyclohexylene, 1,4-cyclohexylene, 4-methyl-1,3-cyclohexylene, 2-methyl-1,3-cycohexylene, 5,5-dimethyl-1,3- cyclohexylene, 2-methyl-1,4-cyclohexylene, 4,6-dimethyl-1,3-cyclohexylene, 4-methyl-1,2-cyclohexylene and 1.4-piperazinediyl.

The reactive radical Y is a low molecular weight alkanoyl or alkylsulfonyl radical which is substituted by a detachable atom or a detachable group; a low molecular weight alkenoyl or alkenesulfonyl radical which can be substituted by a detachable atom or a detachable group; a carbocyclic or heterocyclic radical which contains 4-, 5- or 6-ring members, is bonded via carbonyl or sulfonyl group and substituted by a detachable atom or a detachable group; or a triazine or primidine radical which is bonded directly via a carbon atom and substituted by a detachable atom or a detachable group; or contains such a radical. Examples of such reactive radicals are a halogen-containing 6-membered heterocyclic radical, such as a halotriazine or halopyrimidine radical, or an aliphatic acyl radical, such as a halopropionyl or haloacryloyl radical, or a β-haloethylsulfonyl, β-sulfatoethylsulfonyl or vinylsulfonyl radical. The reactive radical Y is preferably a halotriazine or halopyrimidine radical or the radical of a fibre-reactive acyl compound which is bonded to the —N($R_2$)- group via the carbonyl group, for example an β, β dibromopropionyl radical. Furthermore, Y can also be reactive radicals which are bonded to the —N($R_2$) — group via a bridge member, for example alkylcarbonyl. In some cases, the radical Y can carry a substituent which itself contains a fibre-reactive radical. Suitable of this purpose are in particular haloriazine radicals to which a vinylsulfonyl radical or an equivalent group, for expamle β-chloroethyl-sulfonyl, is bonded via an aliphatic, aromatic, mixed aliphatic-aromatic or heterocyclic bridge member. Examples of preferred bridge member radicals Y are the following:

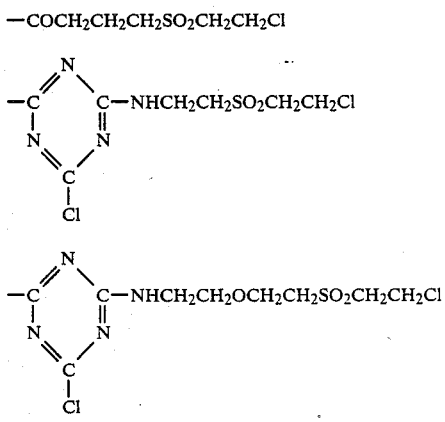

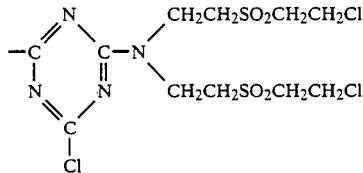

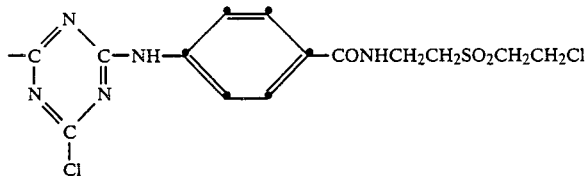

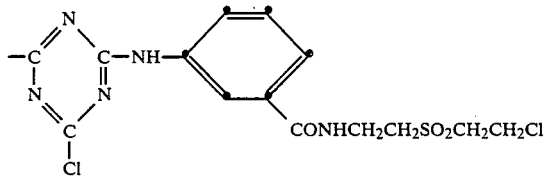

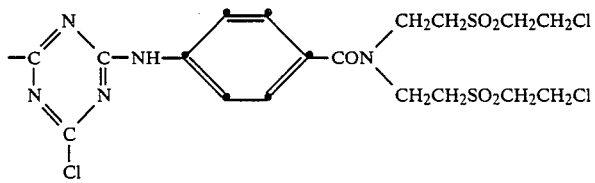

and the corresponding fluorotriazine radicals. Reactive radicals Y are further preferably chlorotriazine or fluorotriazine radicals which contain a non-fibre-reactive substituent, for example —NH$_2$, β-sulfatoethylamino, β-hydroxy-ethylamino, N,N-di-β-hydroxyethylamino, phenylamino, N-ethyl-N-phenylamino, m-sulfophenylamino, p-sulfophenylamino, morpholino, methoxy, isopropoxy or the like; and halopyrimidine radicals, for example the 2,4-difluoropyrimid-6-yl radical and the 2,4difluoro-5-chloropyrimid-6-yl radical.

Of the reactive dyes of the formula (1), preference is given to those (a) in which n is 0;
(b) in which m is 1;
(c) which are those of the formula

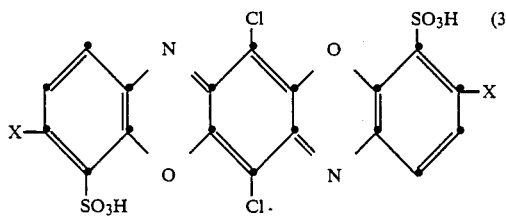

in which X is as defined under the formula (1);
(d) in which R$_1$ and R$_2$ are hydrogen;
(e) in which A is propylene which can be substituted by chlorine, hydroxyl, methyl or phenyl;
(f) in which A is 1,2-propylene, 1,3-propylene, 2-hydroxy-1,3-propylene, 1-phenyl-1,3-propylene, 2-phenyl-1,3propylene, 2-(4'-sulfophenyl)-1,3-propylene or 2-methyl-1,3-propylene;
(g) in which A is 1,2-propylene, 1,3-propylene or 2-methyl-1,3-propylene;
(h) in which A is 1,3-propylene;
(i) in which one X is a radical of the formula

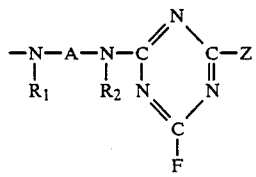

and Z is -NH$_2$ or a substituted amino group.

Possible substituted amino groups Z are: alkylamino, N,N-dialkylamino, cycloalkylamino, N,N-dicycloalkylamino, aralkylamino, arylamino groups, mixed substituted amino groups, such as N-alkyl-N-cyclohexylamino and N-alkyl-N-arylamino groups, furthermore amino groups which contain heterocyclic radicals which can contain further fused-on carbocyclic rings, and also amino groups in which the amino mitrogen atom is part of a N-heterocyclic ring which can contain further heteroatoms. The abovementioned alkyl radicals can be straight-chain or branched, of low molecular weihgt or of high molecular weight, poreference being given to alkyl radicals having 1 to 6 carbon atoms; suitable cycloalkyl, aralkyl and aryl radicals are in particular cyclohexyl, benzyl, phenethyl, phenyl and naphthyl radicals; heterocyclic radicals are in particular furan, thiophene, pyrazole, pyridine, pyrimidine, quinoline, benzimidazole, benzothiazole and benzoxazole radicals; and the amino groups in which the amino nitrogen atom is part of an N-heterocylic ring are preferably radicals of 6-membered N-heterocyclic compounds which can contain nitrogen, oxygen and sulfer as further heteroatoms. The abovementioned alkyl, cycloalkyl, aralkyl and aryl radicals, the heterocyclic radicals and the N-heterocyclic rings can be further substituted, for example by: halogen, such as flourine, chlorine or bromine, nitro, cyano, triflouromethyl, sulfamoyl, carbamoyl, $C_{1-4}$-alkyl, $C_{1-4}$-alkoxy, acylamino groups, such as acetylamino, ureido, hydroxyl, carboxyl, sulfomethyl or sulfo.

Examples of the amino radical Z in the formula (4) are: —$NH_2$, methylamino, ethylamino, propylamino, isopropylamino, butylamino, hexylamino, β-methoxyethylamino, γ-methoxpropylamino, β-ethoxyethylamino, N,N-dimethylamino, N,N-diethylamino, β-chloroethylamino, β-cyanoethylamino, γ-cyanopropylamino, β-carboxethylamino, sulfomethylamino, β-sulfoethylamino, β-hydroxyethylamino, N,N-di-β-hydroxyethylamino, γ-hydroxpropropylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ehtyl-4-sulfophenylamino, phenylamino, toluidino, xylidino, chloranilino, anisidino, phenetidino, 2-, 3- and 4-sulfoanilino, 2,5-disulfoanilino, sulfomethylanilino, N-sulfo-anilino, 2,5-disulfoanilino, sulfomethylanilino, N-sulfo-methylanilino, 3- and 4-carboxyphenylamimo, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 6-sulfonaphth-2-ylamino, pyrid-2-ylamino, morpholino, piperidino and piperazino.

Preference is further given to reactive dyes (i) in which Z in the formula (4) is —$NH_2$, $C_{1-4}$-alkylamino which can be substituted by hydroxyl or sulfo, N,N-di-$C_{1-4}$-alkylamino which can be substituted by hydroxyl, phenylamino which can be substituted by $C_{1-4}$-alkyl, $C_{1-4}$-alkoxy, halogen, hydroxyl, ureido, acetylamino, carboxyl, sulfo or sulfomethyl, N-$C_{1-4}$-alkyl-N-phenylamino, sulfonaphthylamino or morpholine;

(k) in which Z is a radical of the formula

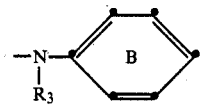
(5)

and $R_3$ is hydrogen or $C_{1-4}$-alkyl which can be substituted by halogen, cyano, hydroxyl, carboxyl, sulfo or sulfato, and the phenyl ring B can be substituted by methyl, methoxy, ethoxy, chlorine, hydroxyl, ureido, acetylamino, carboxyl or sulfo;

(l) in which $R_3$ is hydrogen, and the benzene ring B can be substituted by sulfo or methyl;

(m) in which Z is 2-methyl-5-sulfophenylamino or /-2,5-disulfophenylamino.

By combining the above features, for example g) and (l) or c), h) and k), further preferred subgroups of reactive dyes of the formula (1) are arrived at.

Particular preference is given to (n) the reactive dye of the formula

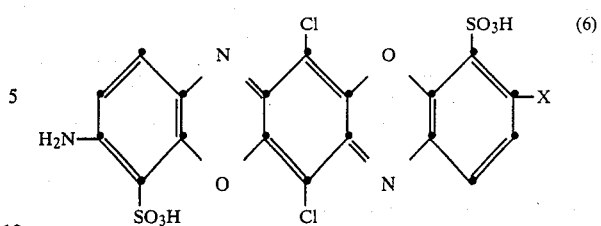
(6)

in which X is a radical of the formula

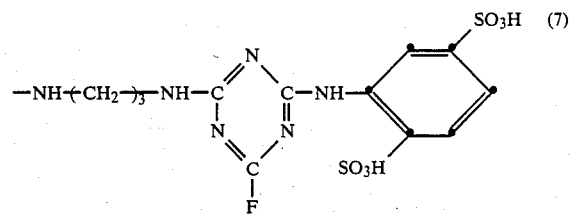
(7)

The preparation of the reactive dyes of the formula (1) comprises condensing dioxazine compounds of the formula

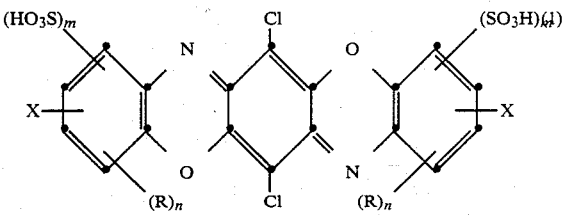

in which R, n and m are as defined under the formula (1), one X is an $H_2N$ group and the other X is a radical of the formula

(8)

with a reactive component of the formula

halogen-Y (9).

If the reactive radical Y is a halotriazine radical, it is possible, by prior or subsequent condensation with an amino, hydroxy or mercapto compound to replace a halogen atom on the triazine ring with an amino, alkoxy, aryloxy, alkylathio or arylthio radical. Examples of such amino, hydroxy and mercapto compounds are the following: ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxy-ethylamine, hydroxypropylamine, aminoethanesulfonic acid, β-sulfatoethylamine, benzylamine, phenethylamine, cyclohexylamine, N-methylaminobenzene, N-ethylaminobenzene, N-propylaminobenzene, N-isopropylaminobenzene, N-butylaminobenzene, N-isobutylaminobenzene, N-sec.-butylaminobenzene, N-hexylaminobenzene, N-β-hydoxyethylamino- benzene, N-β-chloroethylaminobenzene, N-β-cyanoethylaminobenzene, N-β-sulfatoethylaminobenzene, 1-(N-ethylamino)-2-, -3- or -4-methylbenzene, 1-(N-ethylamino)-2-, -3- or -4-chlorobenzene, 1-N-ethylaminobenzene-3- or -4-sulfonic acid, 1-(N-ethylamino)-4-butylbenzene, 1-(N-ethyl-amino)-4-hexylbenzene, 1-(N-ethylamino)-4-octylbenzene, 1-(N-ethylamino)-4-vinyl-benzene, 1-N-n-butylamino-3-methylbenzene, 1(N-ethylamino)-4-fluorobenzene, aniline, o-, m- and p-toluidine, 2,3-, 2,4-,2,5-, 2,6-, 3,4- and 3,5-dimethylaniline, o-, m- and p-chloroaniline, N-methylaniline, N-ethylaniline, 3- or 4-acetylaminoaniline, 2,5-ddimethoxyaniline, o-, m- and p-anisidine, o-, m- and p-phenetidine, 2-methoxy-5-methyl-aniline, 2-ethoxy-5-methoxyaniline, 4-bromoaniline, 3-aminobenzamide, 4-aminophenylsulfamide, 3-trifluoromethyaniline, 3-and 4-aminophenylsulfamide, 3trifluoromethylaniline, 3-and 4-aminophenylurea, 1naphthlyamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, aniline-N-methanesulfonic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamino-1-, -3-, -4-, -5-, -6-, -7-, and -8-sulfonic acid, 1-naphthlamine-2,4-, -2,5-, -2,7-, -2,8-, -3,5-, -3,6-, -3,7-, -3,8-, -4,6-, 4,7-,-4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,6,8-trisulfonic acid, 2-naphthylamine-1,3,7-, -1,5,7-, -3,6,7-, -3,6,8- and -4,6,8-trisulfonic acid, 2-, 3-and 4-aminopyridine, 2-aminobenzothiazole, 5-, 6- and 8-aminoquinoline, 2-aminopyrimidine, morpholine, piperidine, piperazine, water, methanol, ethanol, propanol, isopropanol, n-butanol, isobutanol, sec. -butanol, tert.-butanol, hexanol, cyclohexanol, β-methoxyethanol, β-ethoxyethanol, γ-methoxypropanol, γethoxyprophanol, β-ethoxy-βethoxyethanol, glycolic acid, phenol, o-, m- and p-chlorophenol, methanethiol, ethanethiol, propanethiol, isopropanethiol-n-butanethiol, thioglycolic acid, thiourea, thiophenol, α-thionaphthol, β-thionaphthol.

In the preparation of such triazine dyes, the indidividual process steps can be carried out in various orders, in some instances, if desired, even simultaneously in which case, different process variants are possible. In general, the reaction is carried out in sucessive steps.

In the process of preparation, it depends on the structure of the starting materials which of the possible process variants produce the best results or under which specific conditions, for example at which condensation temperature, the reaction is most advantageously carried out.

Important process variants comprise 1. condensing a dioxazine compound of the formula (1) in which X is a radical of the formula (8) with a 2,4,6-trihalo-3-triazine and condensing the resulting condensation product with 1 mole of an amine; and 2. monocondensing 2,4,6-trihalo-s-triazine with an amine, and condensing the resulting intermediate in a molar ratio of 1:1 with a dioxazine compound of the formula (1) in which X is a radical of the formula (8).

The condensation of the halotriazines with the amino, hydroxy or mercapto compounds mentioned is effected in a manner known per se, preferably in the presence of alkaline agents.

The preferred preparation of the reactive dye as per (n) comprises condensing a dioxazine compound of the formula

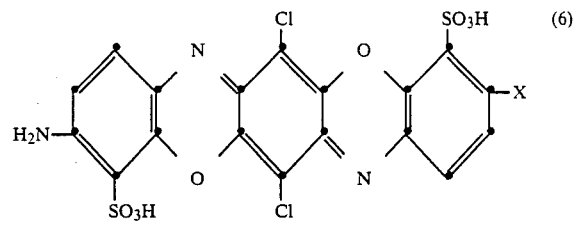

in which X is a radical of the formula

with the compound obtained by monocondensing 2,4,6-trifluoro-s-triazine with aniline-2,5-disulfonic acid and having the formula

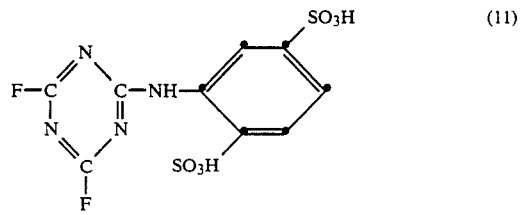

The condensation of the 2,4,6-trifluoro-s-triazine with the dioxazine compounds of the formula (1) is preferably effected in an aqueous solution or suspension, at low temperatures, preferably between 0° and 5° C. and at weakly acid, neutral or weakly alkaline pH. Advantageously, the hydrogen fluoride freed in the course of the condesation is continuously neutralized by adding aqueous alkali hydroxides, carbonates or bicarbonates. For the further reaction of the resulting fluorotriazine dyes or for the reaction of the 2,4,6-trifluoro-s-triazine with amines, the free amines or salts thereof, preferably the hydrochloride, are used. The reaction is carried out at temperatures between about 0° and 40° C., preferably between 5° and 25° C., in the presence of an acid-binding agent, preferably sodium carbonate, within a pH range of 2 to 8, perferably to 6.5.

The condensation of the fluorotriazine with an amine can take place before or after the condensation of the fluorotriazine with a dioxazine of the formula (1). The condensation of the fluorotriazine with an amine is preferably effected in aqueous solution or suspansion, at low temperature and at weakly acid to neutral pH. Here too the hydrogen chloride freed in the course of the condensation is advantageously neutralized by the continous addition of alkali metal hydroxides, carbonates or bicarbonates.

The starting dioxazine of the formula (1) in which X is an H₂N group and the othere X is a radical of the formula (8) are prepared in a conventional manner by ring closure from the anil of the formula

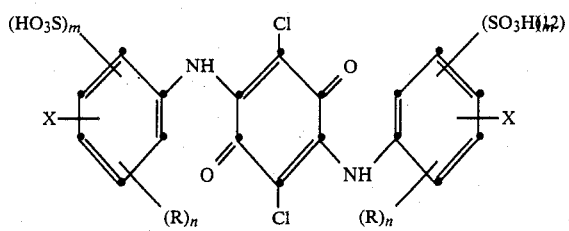

The reactive dyes of the formula (1) can be isolated and worked up into usable, dry dye products. The isolation is preferably effected at very low temperatures by salting out and filtering. After filtering, the dyes can, if desired, by dried after the addition of extenders and/or buffers, for example after addition of a mixture of equal parts of monosodium phosphate and disodium phosphate; preferably, the drying is carried out at moderate temperatures and under reduced pressure. By spray-drying the synthesis mixture as a whole, the dry preparations according to the invention can in certain cases be prepared directly, i.e. without intermediate isolation of the dyes.

The reactive radical Y contains a substituent which is or contains a fibre-reactive leaving group, or which can become active in the manner of fibrer-reactive leaving groups. Fibre-reactive compounds are to be understood as meaning compounds which are capable of reacting the hydroxyl groups of cellulose, the amino, carboxyl, hydroxyl and thiol groups in the case of wool and silk or with the amino and possibly carboxyl groups of synthetic polyamides to form covalent chemical bonding.

The reactive dyes of the formula (1) are suitable for dyeing and printing a very wide range of materials, such as silk, leather, wool, polyamide fibres and polyurethanes, and in particular cellulose-containing fibre materials of any kind. Such fibre materials are, for example, the natural cellulose fibre, such as cotton, linen and hemp, and also cellulose polp and regenerated cellulose. The reactive dyes of the formula (1) are also suitable for dyeing or printing hydroxyl-containing fibres which are present in blend fabrics, for example blends of cotton with polyester fibres or polyamide fibres.

The dyes according to the invention can be applied to the fibre material and fixed on the fibre in various ways, in particular in the form of aqueous dye solutions and print pastes.

They are suitable not only for the exhaust method of dyeing but also for dyeing by the pad-dyeing method, whereby the material is impregnated with aqueous, possibly salt-containing dye solutions, and the dyes are fixed after an alkali treatment or in the presence of alkali, if desired by heating. They are particularly suitable for the cold pad-batch process, whereby the dye is applied together with the alkali on a pad-mangle and thereafter fixed by storing for several hours at room temperature. After fixing, the dyes and prints are thoroughly rised with cold and hot water, in the presence or absence of an agent which has a dispersing action and promotes the diffusion of the unfixed portions.

The reactive dyes of the formula (1) are distinguished by high reactivity and good fixing properties. They can therefore be used for exhaust dyeing at low dyeing temperatures and only require short steaming times in the pad-steam process. The degrees of fixation are high, and the unfixed portions are readily washed off, the difference between the degree of exhaustion and the degee of fixation being remarkably small, i.e. the hydrolysisj loss being very small. The reactive dyes of the formula (1) are also suitable for printing, in particular on cotton, but also for printing nitrogen-containing fibres, for example wool, silk or wool-containing blend fabrics.

The dyeing and prints prepared with the dyes according to the invention on cellulose fibre materials have a high tinctorial strength and a high fibre-dye bond stability, not only in the acid but also in the alkaline range, and also a good lightfastness and very good wet fastness properties, such as wash, water, seawater, cross-dyeing and perspiration fastness properties, and also a good pleating fastness, hot press fastness and rub fastness.

The examples which follow serve to illustrate the invention. The temperatures are given in degrees Celsius, and parts and percentages are by weight, unless otherwise stated. Parts by weight relate to parts by volume as the kilogram relates to the litre. The preparation of intermediate compounds has not been described in all cases in the working examples which follow, but it is readily apparent from the general description.

EXAMPLE 1:

18 parts of the chromophore of the formula

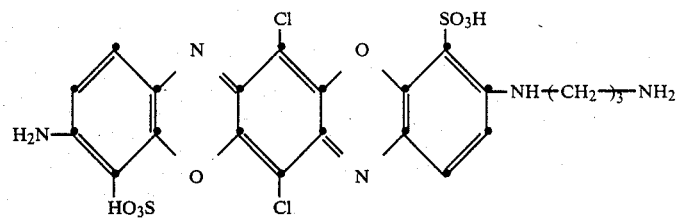

are suspended in 200 parts of water and brought to pH 8 with sodium hydroxide solution. To the suspension obtained are then added 200 parts of a neutral aqueous solution which contains 12.03 parts of the primary condensation product of cyanuric chloride and aniline-2,5-disulfonic acid. Condensation is effected at room temperature and the pH is maintained at about 8 with 1 N sodium hydroxide solution. After acylation of the aliphatic amino group is complete, the dye is isolated with sodium chloride, filtered off and dried in vacuo.

The dye thus obtained has the formula

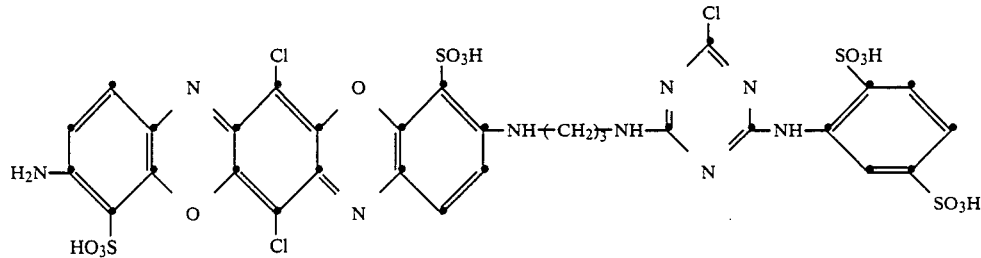

and produces a sky blue dyeing ($\lambda_{max}$ 616 nm).

Similar dyes are obtained on using, for the acylation of the aliphatic amino group of the above chromophore, corresponding amounts of the following acylating agents:

Further dyes are obtained on using in place of aniline-2,5-disulfonic acid equivalent amounts of the amines listed below.

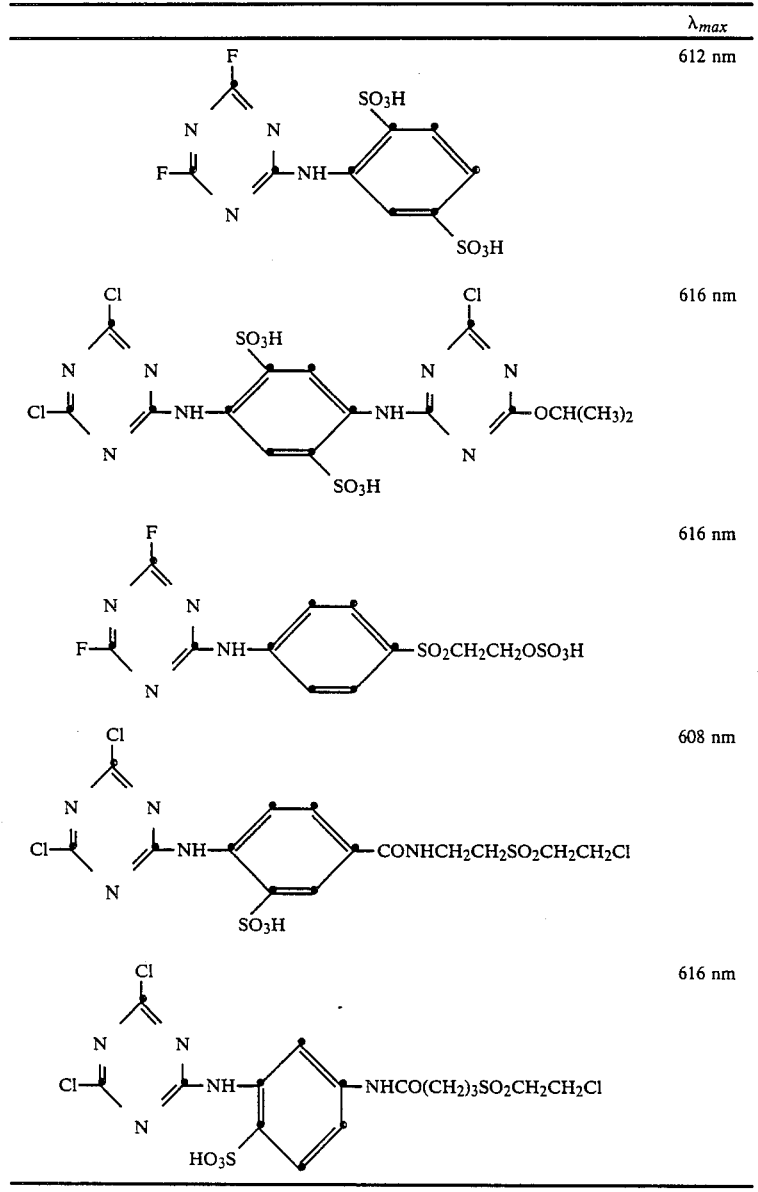

| | $\lambda_{max}$ |
|---|---|
| | 612 nm |
| | 616 nm |
| | 616 nm |
| | 608 nm |
| | 616 nm |

Using in Example 1 not the aniline-2,5-disulfonic acid but an equivalent amount of 2-methylaniline-5-sulfonic acid produces a similar dye.

| Example | Amines |
|---|---|
| 2 | ammonia |
| 3 | methylamine |
| 4 | ethanolamine |

| Example | Amines |
|---|---|
| 5 | diethanolamine |
| 6 | taurine |
| 7 | n-butylamine |

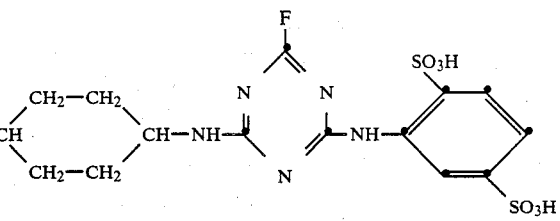

| | |
|---|---|
| 8 | aniline |
| 9 | N—methylaniline |
| 10 | N—ethylaniline |
| 11 | m-toluidine |
| 12 | p-toluidine |
| 13 | m-chloroaniline |
| 14 | p-chloroaniline |

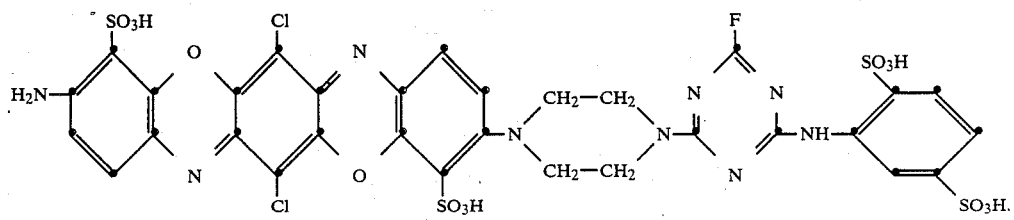

| | |
|---|---|
| 15 | o-anisidine |
| 16 | p-anisidine |
| 17 | p-phenetidine |
| 18 | p-aminibenzoic acid |
| 19 | aniline-3-sulfonic acid |
| 20 | 4-aminoacetanilide |
| 21 | 3-aminophenylurea |
| 22 | 4-aminophenylurea |
| 23 | diethylamine |
| 24 | morpholine |
| 25 | 2-naphthylamine-6-sulfonic acid |
| 26 | 4-aminosalicylic acid |
| 27 | aniline-2,4-disulfonic acid |
| 28 | 1-naphthylamine-4-sulfonic acid |
| 29 | 1-naphthylamine-5-sulfonic acid |
| 30 | 2-naphthylamine-6,8-disulfonic acid |
| 31 | 2-naphthylamine-4,8-disulfonic acid |
| 32 | 2-naphthylamine-5,7-disulfonic acid |
| 33 | 2-naphthylamine-6,8-disulfonic acid |
| 34 | 1-naphthylamine-3,6-disulfonic acid |
| 35 | 1-naphthylamine-4,6-disulfonic acid |
| 36 | 2-naphthylamine-3,6,8-trisulfonic acid |

EXAMPLE 37:

Example 1 is repeated, except that the chromophore used there is replaced by a corresponding amount of the 2,9-dichloro compound, affording a dye of the formula

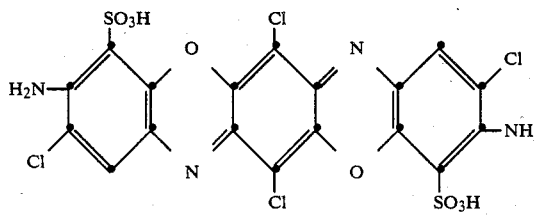

which dyes cotton in reddish blue shades.

EXAMPLE 38:

Example 1 is repeated, except that the 1,3-diaminopropane bridge member is replaced by 1,4-diaminocyclohexane, affording a dye of the presumable formula which dyes cotton in blue shades.

EXAMPLE 39:

Example 1 is repeated, except that the 1,3-di-aminopropane bridge member is replaced by piperazine, affording a dye of the presumable formula Dyeing method 1

2 parts of the dye obtained as described in Example 1 are dissolved in 100 parts of water at 20° to 50° C. in the presence of 5 to 20 parts of urea and 2 parts of calcined sodium carbonate. A cotton fabric is impregnated with the resulting solution, so that its weight increases by 60 to 80%, and is then dried. This is followed by heat setting at 140° to 210° for a half to 5 minutes, and thereafter soaping off for quarter of an hour in a 0.1% boiling solution of a nonionic detergent, rinsing and drying.

Dyeing method 2

2 parts of the dye obtained as described in Example 1 are dissolved in 100 parts of water in the presence of 0.5 part of sodium m-nitrobenzenesulfonate. A cotton fabric is impregnated with the resulting solution, so that its weight increases by 75% and is then dried.

Thereafter the fabric is impregnated with a warm solution at 20° which contains per litre 5 grams of sodium hydroxide and 300 grams of sodium cholride and is squeezed off to a 75% weight increase, and the dyeing is steamed at 100° to 101° for 30 seconds, rinsed, soaped off for quarter of an hour in a 0.3% boiling solution of a nonionic detergent, rinsed and dried.

Dyeing method 3

2 parts of the dye obtainable as descibied in Example 1 are dessolved in 100 parts of water.

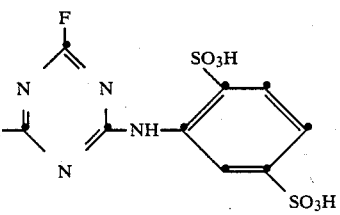

The solution is added to 1,900 parts of cold water, 60 parts of sodium chloride are added, and this dyebath is entered with 100 parts of a cotton fabric.

The temperature is increased to 60°, and after 30 minutes 40 parts of calcined sodium carbonate and a further 60 parts of sodium chloride are added. The temperature is maintained at 60° for 30 minutes, and the dyeing is then rinsed and soaped off for 15 minutes in a 0.3% boiling solution of a nonionic detergent, rinsed and dried.

Dyeing method 4

4 parts of the reactive dye prepared in Example 1are dissolved in 50 parts of water. To this solution are added 50 parts of a solution which contains per litre 5 g of sodium hydroxide and 10 g of calcined sodium carbonate. The solutoin obtained is used to pad-mangle a cotton fabric so that its weight increases by 70%, and the fabric is then wound up on a roll. The cotton fabric is stored in this state at room temperature for 3 to 12 hours. Thereafter the dyed fabric is rinsed, soaped off at the boil for quarter of an hour with a nonionic detergent, rinsed once more and dried. The result obtained is a blue dyeing having good fastness properties.

What is claimed is:

1. A reactive dye of the formula

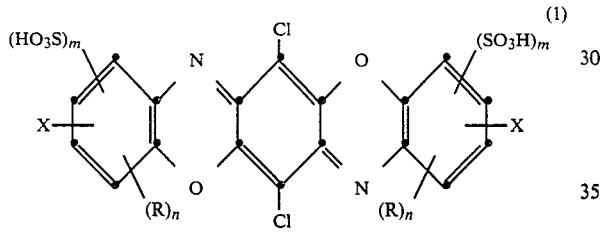

in which $(R)_n$ stands for n substituents R which, independently each other, are $C_{1-4}$-alkyl, $C_{1-4}$-alkoxy, halogen, carboxyl, carbamoyl, N-$C_{1-4}$-alkylcarbamoyl, N,N-di-$C_{1-4}$-alkylcarbamoyl, $C_{1-4}$-alkylsulfonyl, sulfamoyl, N-$C_{1-4}$-alkylsulfamoyl or N,N-di-$C_{1-4}$-alkylsulfamoyl, n is 0 to 2, m is 1 to 2, one X is an $H_2N$ group and the other X is a radical of the formula

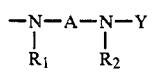

in which $R_1$ and $R_2$ are independently of each other hydrogen or $C_{1-4}$-alkyl which is unsubstituted or substituted by halogen, hydroxyl, cyano, sulfo or sulfato, A is $C_{2-4}$-alkylene which is unsubstituted or substituted by halogen, hydroxyl, carboxyl, sulfo, phenyl, sulfophenyl or $C_{1-4}$-alkoxycarbonyl, or is cyclohexylene which unsubstituted or substituted by $C_{1-4}$alkyl, or in which the group —N($R_1$)—A—N($R_2$)—is 1,4-piperazinediyl, and Y is a radical of the formula —COCH₂CH₂CH₂SO₂CH₂CH₂Cl,

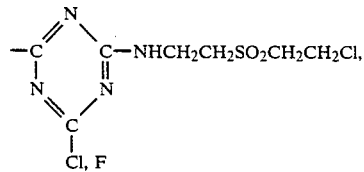

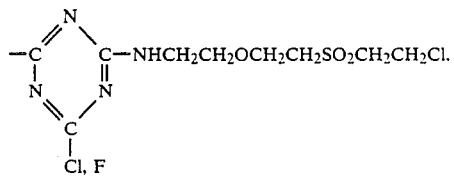

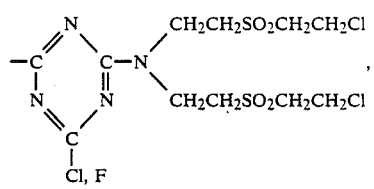

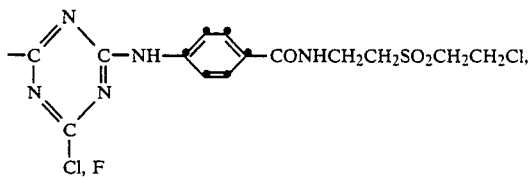

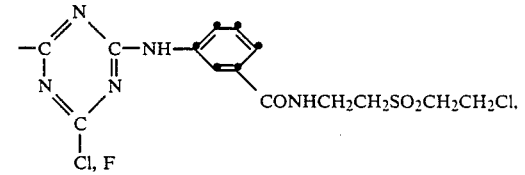

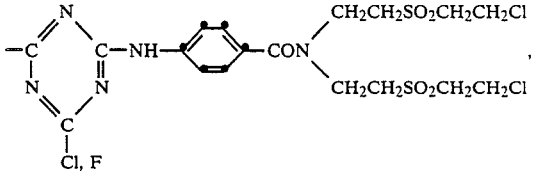

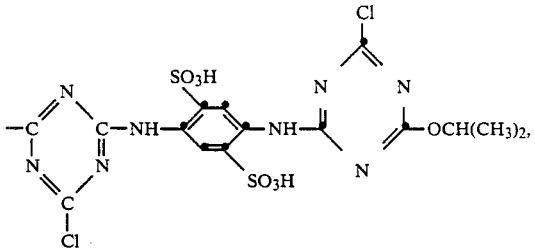

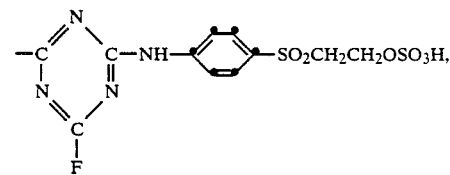

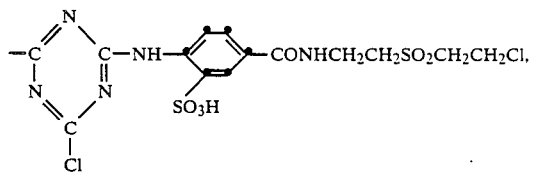

-continued

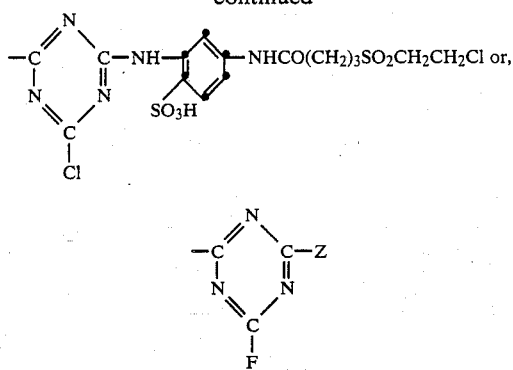

wherein Z is methoxy, isopropoxy, —NH$_2$, and N-C$_1$-C$_6$-alkylamino, N,N-di-C$_1$-C$_6$-alkylamino, cyclohexylamino, benzylamino, phenethylamino, phenylamino, naphthylamino, N-C$_1$-C$_6$-alkyl-N-cyclohexylamino, N-C$_1$-C$_6$-alkyl-N-phenylamino, furanylamino, thiophenylamino, pyrazolylamino, pyridylamino, pyrimidinylamino, quinonylamino, benzimidazolylamino, benxthiazolylamino or benzoxazolylamino radical or the radical of a 6-membered N-heterocyclic compound which can contain nitrogen, oxygen and sulfur as further heteroatoms, all of which radicals mentioned above are unsubstituted or substituted by halogen, nitro, cyano, trifluoromethyl. sulfamoyl, carbamoyl, C$_1$-C$_4$-alkyl, C$_1$-C$_4$-alkoxy, acetylamino, ureido, hydroxyl, carboxyl, sulfomethyl or sulfo, or Y is a chlorotriazine radical which is substituted by —NH$_2$, β-sulfatoethylamino, β-hydroxyethylamino, N,N,di-β-hydroxyethylamino, phenylamino, N-ethyl-N-phenylamino, m-sulfophenylamino, p-sulfophenylamino, 2,5-disulfophenylamino, morpholino, methoxy or isopropoxy, or is a 2,4-difluoropyrimid-6-yl or 2,4-difluoro-5-chloro-pyrimid-6-yl radical.

2. A reactive dye according to claim 1, in which n is 0.

3. A reactive dye according to claim 1, in which m is 1.

4. A reactive dye according to claim 1, of the formula

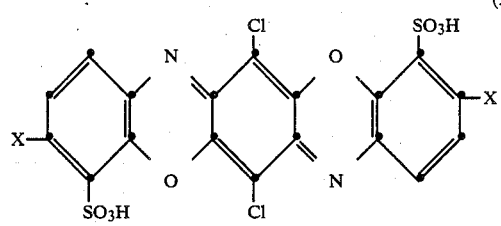

in which X is as defined in claim 1.

5. A reactive dye according to claim 1, in which R$_1$ and R$_2$ are hydrogen.

6. A reactive dye according to claim 1, in which A is propylene which is unsubstituted or substituted by chlorine, hydroxyl, mehtyl, 4-sulfophenyl or phenyl.

7. A reactive dye according to claim 6, in which A is 1,2-propylene, 1,3-propylene, 2-hydroxy-1,3-propylene, 1-phenyl-1,3-propylene, 2-phenyl-1,3-propylene, 2-(4'-sulfophenyl)-1,3-propylene or 2-methyl-1,3-propylene.

8. A reactive dye according to claim 7, in which A is 1,2-propylene, 1,3-propylene or 2-methyl-1,3--propylene.

9. A reactive dye according to claim 8, in which A is 1,3-propylene.

10. A reactive dye according to claim 1, in which one X is a radical of the formula

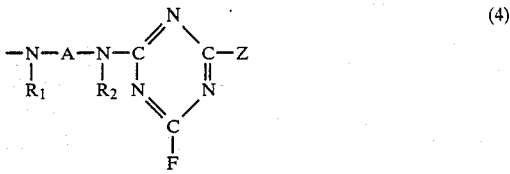

and Z is —NH$_2$, and N-C$_1$-C$_6$-alkylamino, N,N-di-C$_1$-C$_6$-alkylamino, cyclohexylamino, benzylamino, phenethylamino, phenylamino, naphthylamino, N-C$_1$-C$_6$-alkyl-N-cyclohexylamino, N-C$_1$-C$_6$-alkyl-N-phenylamino, N-C$_1$-C$_4$-alkyl-N-phenylamino, furanylamino, thiophenylamino, pyrazolylamino, pyridylamino, pyrimidinylamino, quinonylamino, benzimidazolylamino, benzthiazolylamino or benzoxazolylamino radical or the radical of a 6-membered N-heterocyclic compound which can contain nitrogen, oxygen and sulfur as further heteroatoms, all of which radicals mentioned above are unsubstituted or substituted by halogen, nitro, cyano, trifluoromethyl, sulfamoyl, carbamoyl, C$_1$-C$_4$-alkyl, C$_1$-C$_4$-alkoxy, acetylamino, ureido, hydroxyl, carboxyl, sulfomethyl or sulfo.

11. A reactive dye according to claim 10, in which Z is —NH$_2$, C$_{1-4}$-alkylamino which can be substituted by hydroxyl or sulfo, N,N-di-C$_{1-4}$-alkylamino which can be substituted by hydroxyl, phenylamino which can be substituted by C$_{1-4}$-alkyl, C$_{1-4}$-alkoxy, hydroxyl, ureido, acetylamino, carboxyl, sulfo or sulfomethyl, N-C$_1$-alkyl-N-phenylamino, sulfonaphthylamino or morpholino.

12. A reactive dye according to claim 10, in which Z is a radical of the formula

and R$_3$ is hydrogen or C$_{1-4}$-alkyl which can be substituted by halogen, cyano, hydroxyl, carboxyl, sulfo or sulfato, and the phenyl ring B can be substituted by methyl, methoxy, ethoxy, chlorine, hydroxyl, ureido, acetylamino, carboxyl or sulfo.

13. A reactive dye according to claim 12, in which R$_3$ is hydrogen, and the benzene ring B can be substituted by sulfo or methyl.

14. A reactive dye according to claim 13, in which Z is 2-methyl-5-sulfophenylamino or 2,5-disulfophenylamino.

15. A reactive dye according to claim 14, of the formula

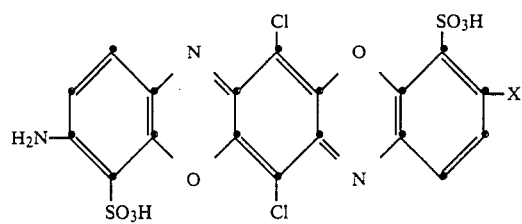 (6)
in which X is a radical of the formula
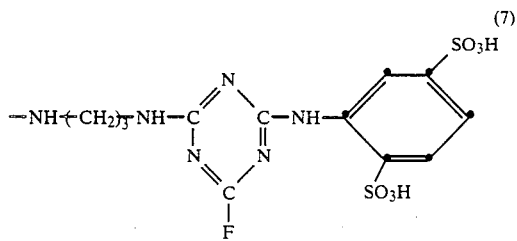 (7)
* * * * *